(12) United States Patent
Smith et al.

(10) Patent No.: US 8,108,077 B2
(45) Date of Patent: Jan. 31, 2012

(54) INTELLIGENT SENSOR FOR IRRIGATION MANAGEMENT

(75) Inventors: Brian J. Smith, Aliso Viejo, CA (US); Eric Schafer, Carlsbad, CA (US)

(73) Assignee: Signature Control Systems, Inc., Irvine, CA (US)

( * ) Notice: Subject to any disclaimer, the term of this patent is extended or adjusted under 35 U.S.C. 154(b) by 199 days.

(21) Appl. No.: 12/149,405

(22) Filed: May 1, 2008

(65) Prior Publication Data

US 2009/0276102 A1    Nov. 5, 2009

(51) Int. Cl.
*G05D 11/00* (2006.01)
*G05D 7/00* (2006.01)
*A01G 27/00* (2006.01)

(52) U.S. Cl. .............................. 700/284; 239/69; 239/70

(58) Field of Classification Search .................. 700/284; 239/69, 70
See application file for complete search history.

(56) References Cited

U.S. PATENT DOCUMENTS

| | | | |
|---|---|---|---|
| 5,907,491 A | 5/1999 | Canada et al. | |
| 6,013,108 A * | 1/2000 | Karolys et al. | 702/189 |
| 6,141,347 A | 10/2000 | Shaughnessy et al. | |
| 6,314,340 B1 * | 11/2001 | Mecham et al. | 700/284 |
| 6,437,692 B1 | 8/2002 | Petite et al. | |
| 6,553,336 B1 * | 4/2003 | Johnson et al. | 702/188 |
| 6,600,971 B1 | 7/2003 | Smith et al. | |
| 6,898,467 B1 * | 5/2005 | Smith et al. | 700/20 |
| 7,103,511 B2 | 9/2006 | Petite | |
| 7,269,829 B2 | 9/2007 | Smith et al. | |
| 2007/0293990 A1 * | 12/2007 | Alexanain | 700/284 |
| 2009/0099701 A1 * | 4/2009 | Li et al. | 700/284 |

* cited by examiner

*Primary Examiner* — Kakali Chaki
*Assistant Examiner* — Sivalingam Sivanesan
(74) *Attorney, Agent, or Firm* — Posz Law Group, PLC

(57) ABSTRACT

An intelligent sensor includes an irrigation related data sensor for sensing irrigation related data and a network processor coupled to the irrigation related data sensor for receiving the irrigation data. The intelligent sensor also includes an interface coupled to the network processor for coupling the intelligent sensor to a communication bus of a peer-to-peer distributed network. The intelligent sensor also includes a memory including instructions for configuring the processor to generate a broadcast message including the irrigation related data. The interface transmits the broadcast message to a destination node coupled to the peer-to-peer distributed network via the communication bus. The destination node can be satellite field irrigation controllers or a control device.

20 Claims, 8 Drawing Sheets

INTELLIGENT SENSOR FOR IRRIGATION MANAGEMENT

TECHNICAL FIELD

The technical field relates generally to an apparatus, method and/or system for managing irrigation, and, more particularly, to an intelligent sensor connected to a peer-to-peer distributed network with the ability to be remotely monitored and controlled from another node on the peer-to-peer distributed network.

BACKGROUND

An exemplary conventional control system 900 for irrigation management and control, which will be referred to here as a central-satellite system, is shown in FIG. 6A. The system 900 includes a central computer 902, a plurality of irrigation satellite field controllers (satellite controllers) 904, and a number of sensor data sources 906. The central computer 902 can be connected to the satellite controllers 904 by a first communication link 908 and to the sensor sources 906 by a second communications link 910. The first and second links 908, 910 can be wireless or wire line communication links of a local area network. The central computer 902 can include a user interface such as a keypad and a liquid crystal display so that a user can set up automatic watering programs, perform manual watering and perform additional functions for irrigation control.

The satellite controllers 904 can be connected to irrigation solenoid valves 912 to deliver water in accordance with the water programming or manual control. The sensor data sources 906 can monitor multiple variables that typically include the amount of rainfall, water flow and power consumption, and provide this data to the central computer 902 via the second communication link 910. The central computer 902 can distribute the data directly to the satellite controllers 904 so that the irrigation scheduling can be adjusted based upon the data. Alternatively, the central computer 902 can make the irrigation scheduling adjustments based on the data and distribute the adjustments to the satellite field controllers 904.

The central-satellite system 900 has the limitation of a costly architecture due to the requirement of multiple communication paths to be created and maintained between the central computer 902 and the satellite controllers 904. Further, in the central-satellite system 900 the number of sensor data sources is limited to the number of connections the central computer 902 can manage. Also, the central computer 902 must be used to gather and distribute data.

Another exemplary conventional control system 900' for irrigation management and control, which will be referred to here as a peer-to-peer distributed network, is shown in FIG. 6B and described in U.S. Pat. No. 6,898,467 entitled "Distributed Control Network for Irrigation Management", the contents of which are incorporated herein by reference. In this system 900' the sensor data sources 906 are connected to dedicated sensor ports at the satellite controllers 904 via communication links 914. The system 900' can further include a collection of individual sensors for providing a weather station connected via a data-logger to the central computer 902. The satellite controllers 904 and the central computer 902 are connected to the first communication link 908 of a peer-to-peer network. The first link 908 can be a communication bus. Although the peer-to-peer network connection between the satellite controllers 904 permits the sensor data to be shared among the satellite controllers 904, the number of sensor sources 906 is limited to the number of available sensor ports on the satellite controllers 904.

SUMMARY

Accordingly, one or more embodiments provide an intelligent sensor including an irrigation related data sensor for sensing irrigation related data, an interface operable to transmit and receive communications over a communication bus of a peer-to-peer distributed network; a processor coupled to the interface and to the irrigation related data sensor for receiving the irrigation related data; and a memory coupled to the processor, the memory including instructions for configuring the processor to generate a broadcast message including the irrigation related data, wherein the interface transmits the broadcast message to a destination node coupled to the peer-to-peer distributed network via the communication bus. The broadcast message can include a source address of the intelligent sensor and a destination address indicative of the destination node.

The interface can receive a configuration message including operation parameters such as a schedule for acquiring the irrigation related data from the irrigation related data sensor and generating the broadcast message from a node on the network. The processor can be configured to generate the broadcast message in accordance with the operation parameters. The irrigation related data can include data representative of one of soil moisture, soil conductivity, soil temperature, wetted front data and soil salinity.

The processor can be configured to operate in a main mode for generating the broadcast message including the soil related data and a bootloader mode for uploading or downloading an application. The interface can receive a bootloader mode message from another destination node via the communication bus. The processor can be configured to operate in the bootloader mode in response to the bootloader mode message.

One or more embodiments also provide an irrigation satellite field controller operatively coupled to one or more valves of an irrigation system including an interface operable to transmit and receive communications over a communication bus of a peer-to-peer distributed network; a processor coupled to the interface; and a memory coupled to the processor. The memory can include instructions for configuring the processor to generate a control message requesting irrigation related data from an intelligent sensor coupled to the peer-to-peer distributed network. The interface transmits the control message to the intelligent sensor, and receives a broadcast message including the irrigation related data in response to the control message via the communication bus.

One or more embodiments also provide a control device for an irrigation management system comprising: an interface operable to transmit and receive communications over a communication bus of a peer-to-peer distributed network; a processor coupled to the interface; and a memory coupled to the processor, the memory including instructions for configuring the processor to generate a sensor control message requesting irrigation related data from an intelligent sensor coupled to the peer-to-peer distributed network. The interface transmits the sensor control message to the intelligent sensor via the communication bus of the peer-to-peer distributed network.

BRIEF DESCRIPTION OF THE DRAWINGS

The accompanying figures, which together with the detailed description below are incorporated in and form part of the specification, serve to further illustrate various exemplary embodiments and to explain various principles and advantages in accordance with the present invention.

DETAILED DESCRIPTION

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Figure 1:
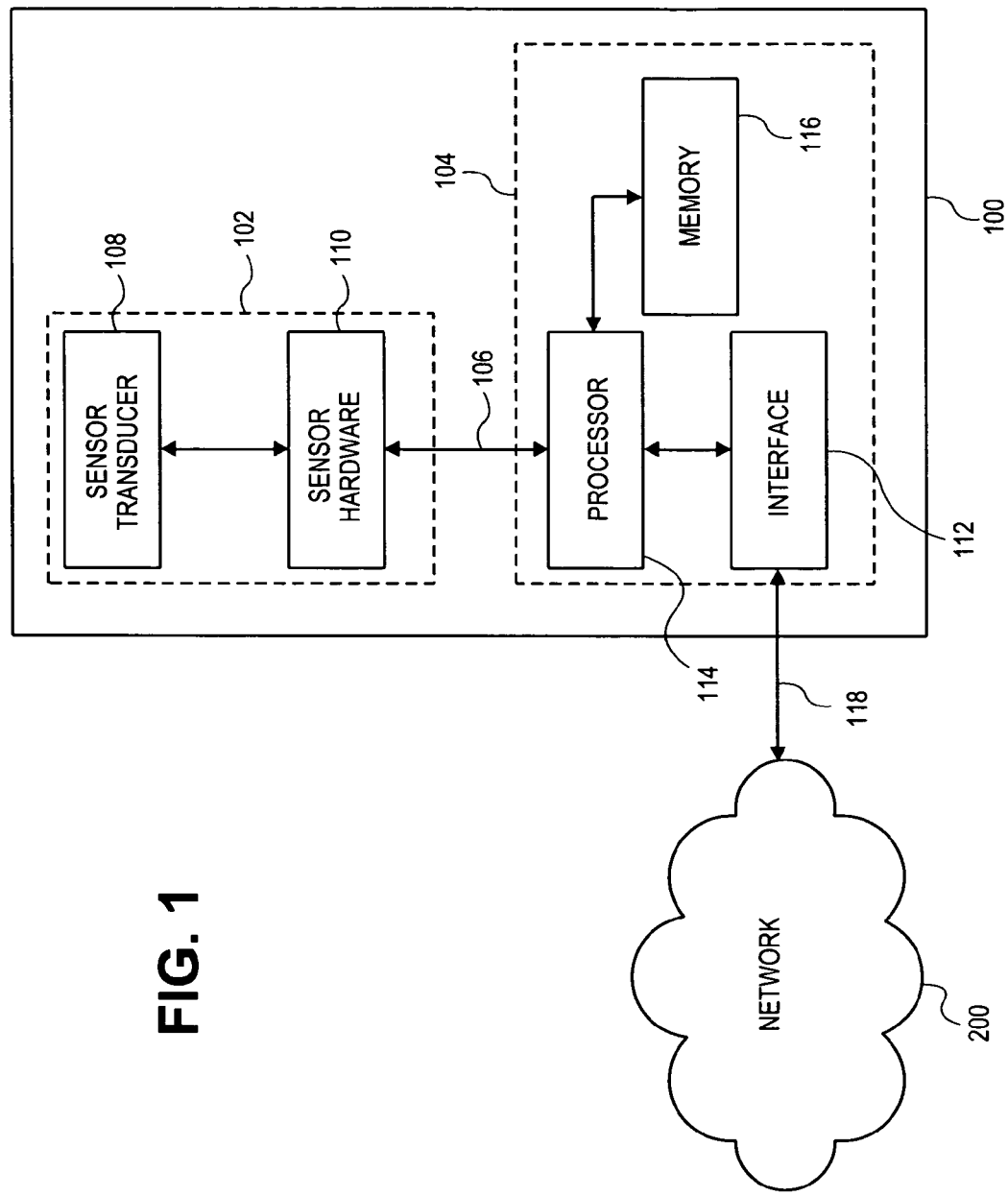
FIG. 1 is a block diagram of an intelligent sensor according to an exemplary embodiment.

Referring to FIG. 1, an intelligent sensor 100 according to an exemplary embodiment will be discussed. The intelligent sensor 100 includes a sensor subsystem 102 coupled to a network subsystem 104 by an internal bus 106. The bus 106 can be, for example, a simple bi-directional 2-wire bus for efficient inter-IC control such as the Inter-IC or I2C-bus, or other electronic configuration which is appropriately configured.

The sensor subsystem 102 includes a sensor transducer 108 for sensing irrigation related data. A simple version of the sensor transducer 108, which will be referred to here as the LITE version, can offer moisture data. A more complex version of the sensor transducer 108, which will be referred to here at the PRO version, can offer soil conductivity, soil temperature, and/or detection of water reaching the transducer 108, which will be referred to here as wetted front data. The wetted front data can be used to assess the rate at which water percolates through the soil. Additionally, the PRO version can provide a better moisture value by using the additional measurements to compensate for error in the reading due to temperature or high salinity soil. The LITE and PRO versions mentioned above are merely examples. Generally, the sensor transducer 108 senses irrigation related data, and will be referred to here as an irrigation related data sensor.

The sensor subsystem 102 also includes sensor hardware 110 such as a microcontroller for converting analog data from the sensor transducer 108 to digital data and interfacing with the bus 106 to collect and maintain sensor measurements in an associated memory. The sensor subsystem 102 may be, for example, a microprocessor.

The network subsystem 104 includes an interface 112, a processor 114 coupled to the interface 112, and a memory 116 coupled to the processor 114. The processor 114 can be coupled to the bus 106. The interface 112 is coupled to a communication link 118 of a peer-to-peer distributed network 200. The interface 112 can be, for example, RF hardware or a modem. The communication link 118 can be, for example, an RS485 communication link.

The memory 116 can be one or a combination of a variety of types of memory or computer readable medium such as random access memory (RAM), read only memory (ROM), flash memory, dynamic RAM (DRAM) or the like. The memory 116 can include a basic operating system, data, and variables, executable code and other data such as measurement values and events (i.e. system fault).

Figure 2:
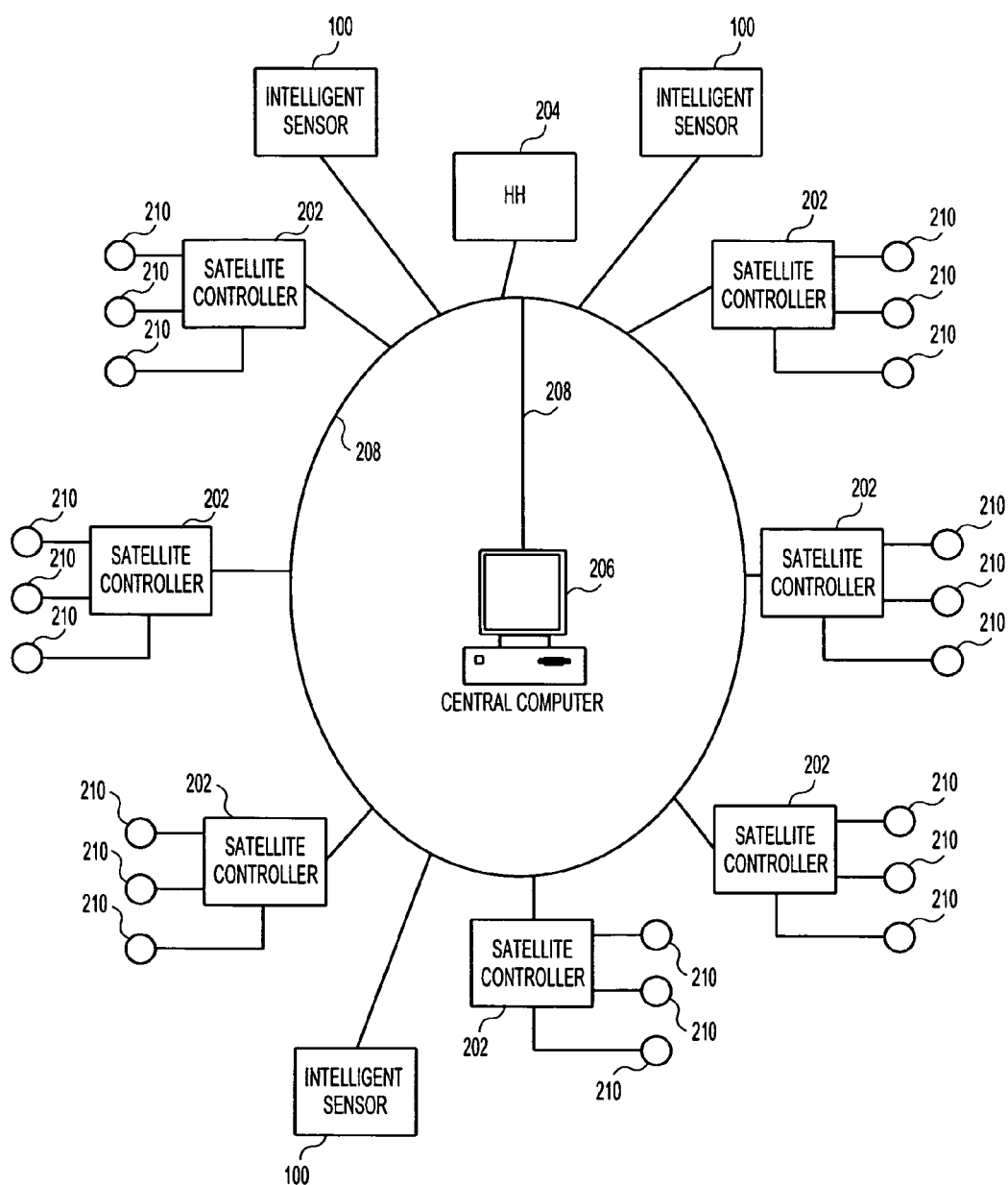
FIG. 2 is a block diagram of a peer-to-peer irrigation control system.

An exemplary peer-to-peer distributed network 200 is shown in FIG. 2. The network 200 includes a plurality of the intelligent sensors 100, a plurality of irrigation satellite field controllers (satellite controllers) 202, a remote hand-held device (HH) 204, and a central computer 206, all of which can be referred to as nodes of the network 200. The entire network 200, or any portion thereof, can be monitored and operated from another node. The central computer 206 is optional and can be omitted. All of the nodes can be connected to one another via a communication bus 208. The bus 208 can use twisted pair wire, radio modems, analog telephone modems, wireless communication (RF, VHF, UHF, microwave frequencies), fiber optics, power lines, telephone cables, cellular telephones, infrared, wireless pager systems, or television cables. The type of communication bus 208 varies depending on the requirements of each individual site. The communication bus 208 is preferably a half-duplex communication bus that allows only one node to transmit at any one time, to avoid data collisions on the bus. Full duplex is an option.

The satellite controllers 202 are preferably connected to solenoid operated valves 210. The satellite controllers 202 can be operated locally to perform, for example, maintenance. The satellite controllers 202 can also be operated remotely from another node in the network 200, such as the HH 204 or the central computer 206, or another satellite controller 202 to create/run complex watering schedules such as evapotranspiration adaptive zones. The user can remotely control a satellite controller 202, which in turn can control some or all of the other satellite controllers 202. It should be noted that the number of satellite controllers 202 illustrated are not representative of any number.

Figure 3:
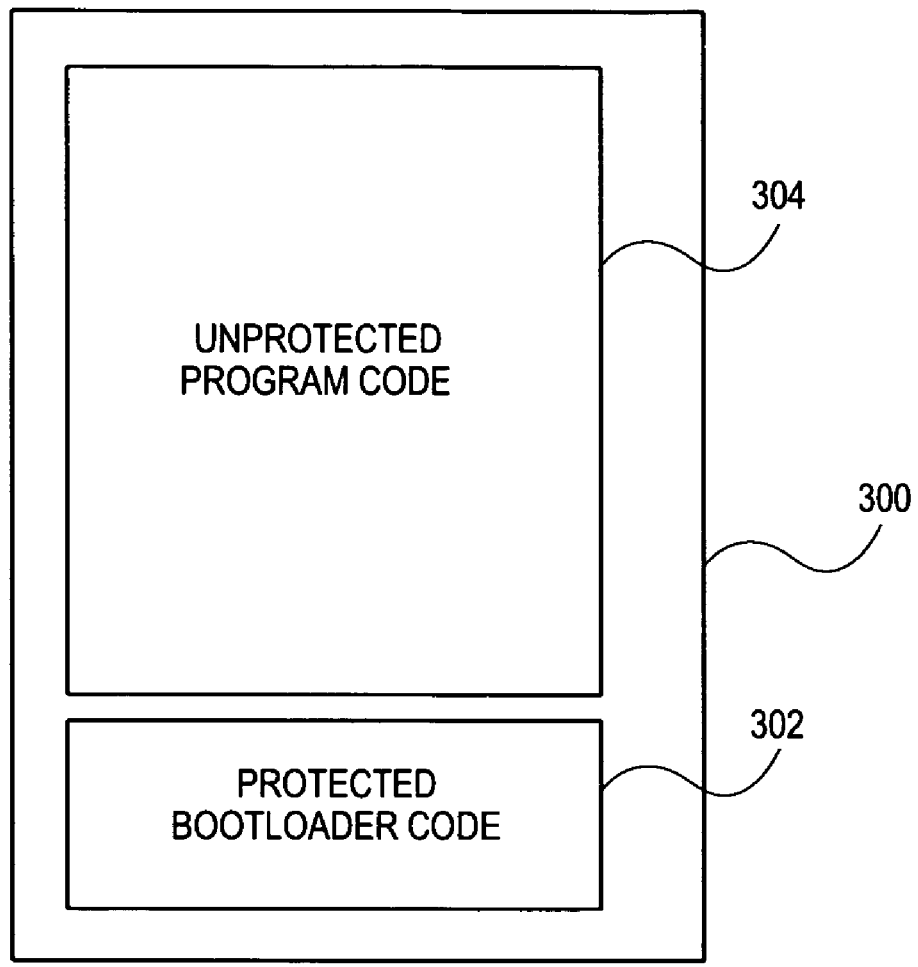
FIG. 3 is a block diagram of an exemplary program memory portion of the intelligent sensor.

Referring to FIG. 3, the processor 114 can include a program memory 300 which includes protected bootloader code 302 and unprotected program code 304. The unprotected program code 304 can include a main application, which is computer-readable instructions such as a computer program for configuring the processor 114 to manage the communication link 118 to the peer-to-peer distributed network 200, initiate sensor acquisitions and retrieve sensor data from the sensor subsystem 102, and to maintain historical logs of sensor data in a portion of the memory 116. The instructions also configure the processor 114 to control the interface 112 to generate messages to be transmitted to and to receive messages from one or more destination nodes at the peer-to-peer distributed network 200 based upon data received from the sensor subsystem 102. The unprotected code 304 can be reprogrammable flash memory. The term protected can refer to a higher level of privileges required for rewriting the code.

The main application includes primary code for configuring the intelligent sensor 100 to operate in main application mode to perform sensor functions and/or secondary bootloader functions for updating the processor of the sensor subsystem 102. The primary code configures the processor 114 to generate messages to be transmitted by the interface 112 to a destination node coupled to the peer-to-peer distributed network 200 via the communication bus 208. The main application also configures the processor 114 to read messages received from a particular node on the network 200. An exemplary format of the messages received and generated when the processor 114 is in the bootloader mode and the main application mode will be discussed below.

The protected program code 302 includes a bootloader application which is executed by the processor 114 for downloading program code to reprogram the main application or uploading program code from or to other nodes on the network 200. The processor 114 can begin to execute the bootloader application upon initial power up so that the intelligent sensor 100 is operated in bootloader mode. In bootloader mode, the intelligent sensor 100 transmits a beacon message to the nodes on the network 200 indicating that it is in bootloader mode. The intelligent sensor 100 will continue to operate in the bootloader mode if it receives a reply message from another node in the network 200 within a predetermined time period to upload or download an application. The predetermined time period may be equal to 10 seconds. Otherwise, the processor 114 will execute the main application so that the intelligent sensor 100 is operating in a main mode until the intelligent sensor 100 is reset. The bootloader application is saved in the protected program code 302 to prevent it from being corrupted or overwritten by fault conditions.

Figure 4:
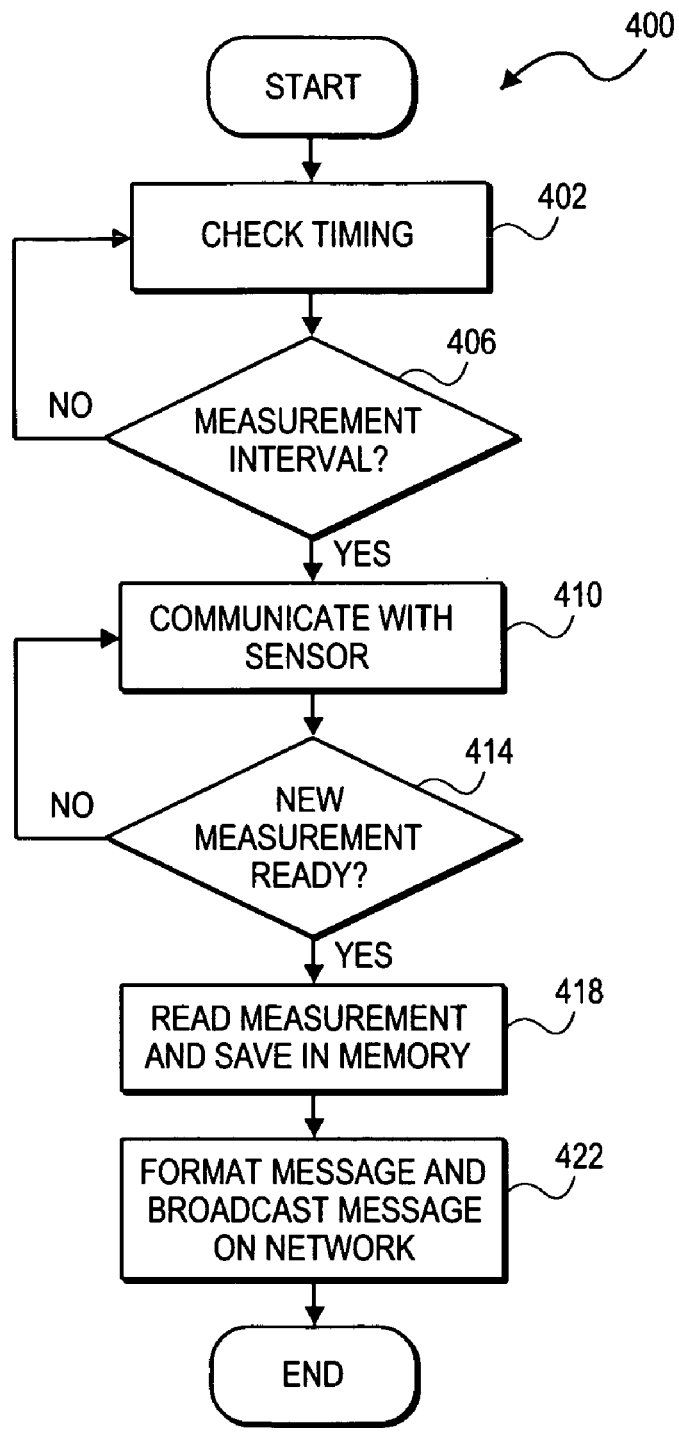
FIG. 4 is a flow diagram illustrating exemplary operations of the intelligent sensor.

Referring to FIG. 4, exemplary operations 400 of the intelligent sensor 100 when acquiring sensor data and delivering it to the network 200 will be discussed. The operations 400 advantageously can be implemented on, for example, an intelligent sensor, such as described in connection or FIG. 1, or other apparatus appropriately. For example, the operation can be performed when the processor 114 executes the main application.

At 402, the intelligent sensor 100 checks a timing module to determine how many time resolutions (i.e., microseconds) have elapsed since a previous measurement or since the intelligent sensor 100 has begin operating in main application mode. The timing module can be an internal clock and a real time clock which increments, for example, every second and updates the internal clock. These clocks can be included in the processor 114.

At 406, the intelligent sensor 100 determines if a predetermined measurement interval has elapsed. If the measurement interval has elapsed (YES at 406), at 410 the processor 114 communicates with the sensor hardware 110 to acquire a new measurement. For example, if the measurement interval is 1 second, the processor 114 communicates with the sensor hardware 110 every second. If the measurement interval has not elapsed (NO at 406), the timing module is checked again at 402.

At 414, the processor 114 determines if a new measurement is ready at the sensor hardware 110 by, for example, receiving a positive or negative indication message from the sensor hardware 110. If no new measurement is ready (NO at 414), the processor 114 continues to communicate with the sensor hardware 110 to wait for the measurement at 410.

If a new measurement is ready at the sensor hardware 110 (YES at 414), at 418 the processor 114 reads the measurement and saves it in, for example, a nonvolatile portion of the memory 116. If a new measurement is not ready at the sensor hardware 110 (NO at 414), the processor 114 again communicates with the sensor hardware 110 to acquire a new measurement. If a new measurement is not attainable, the processor 114 can log a fault record into an internal history log stored in the memory 116.

At 422, the processor 114 formats a message including the measurement and broadcasts the message on the network 200 to one or more nodes, or all of the nodes. This message will be referred to herein as a "broadcast message". Each of the nodes of the network 200 has a unique address used for node to node communications. The broadcast message sent at 422 can include the source address of the intelligent sensor 100 and a destination address indicating one or more nodes. When a broadcast message is sent on the bus 208 of the network 200, all connected nodes will hear the message, but only the node which matches the embedded address will perform the required command and/or respond with an acknowledgement message indicating to the intelligent sensor 100 that the message was received. Additionally, the broadcast message can include a reserved address used for global messages indicating that the message is destined for all nodes on the bus 208. The connected node can decide (based on its particular individual configuration) whether the data should be used or discarded.

Returning to FIG. 3, the main application in the unprotected program code 304 configures the processor 114 to process received messages such as configuration messages, control messages and sensor measurement request messages. The configuration messages include operation parameters for configuring the sensor operation such as the rate at which it acquires measurement data and a schedule for acquiring the irrigation related data from the irrigation related data sensor.

The main application also configures the processor 114 to generate global or addressed messages indicating an internal fault condition or new measurement data which can either be current or historical. Fault conditions include power outages, faulty or broken messages, memory errors, inability to attain a measurement from the sensor hardware 110, etc.

Figure 5:
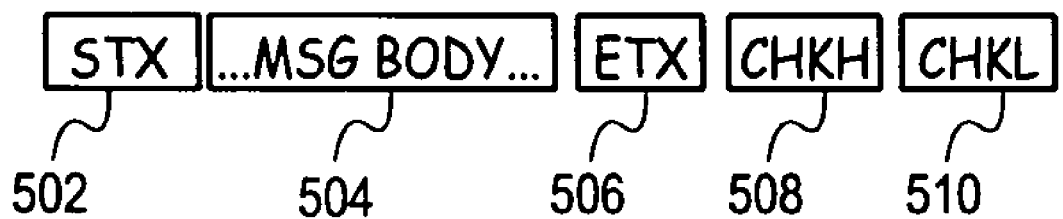
FIG. 5 is an illustration of an exemplary format for messages transmitted on the network.

Referring to FIG. 5, an exemplary message format for messages transmitted between the intelligent sensor 100 and one or more nodes on the network 200 will be discussed. The messages generally include a STX block 502 including a character designating the start of text, a MSG BODY block 504 including variable length message content, an ETX block 506 including a character designating the end of text, and CHKH/CHKL blocks 508, 510 including a checksum of all bytes between STX and ETX (inclusive) or a cyclical redundancy check which allows the recipient to confirm the message contents have not been corrupted in the delivery process.

For network command or broadcast messages, the MSG BODY block 504 can include a source address of the node generating the message and a destination address for the destination node. The MSG BODY block 504 can further include a command code (i.e., 2 character ASCI) as well as the message data which can be formatted with 1 start bit, 8 data bits, no parity bit, and 1 stop bit. The default data rate can be 9600 bps, although different baud rate settings are available. Multiple byte values (e.g. 16 bit integers) can be sent in big-endian format (MSByte first). Example network command messages will be discussed below.

The intelligent sensor 100 is configured to process a transmit configuration request message received from another node requesting the sensor to transmit its configuration settings. The sensor 100 can generate an acknowledgement (ACK) message in reply to the transmit configuration request message including the sensor type (PRO version or LITE version), sensor serial number, processor firmware version, broadcast rate and baudrate.

The intelligent sensor 100 is configured to process a write configuration settings message received from another node transmitting write configurations to the intelligent sensor 100. The write configuration settings message can include the sensor address and broadcast rate. The intelligent sensor 100 can generate an ACK message in reply to the write configuration settings message.

The intelligent sensor 100 is configured to process a reset message received from another node transmitting a reset command to the intelligent sensor 100 for resetting the processor 114 into bootloader mode. The intelligent sensor 100 can generate an ACK message to be sent in reply to the reset command message.

The intelligent sensor 100 is configured to process an address setting command message received from another node for setting the address of the intelligent sensor 100 to a new designated address. The intelligent sensor 100 can generate an ACK message to be sent in reply to the address setting command message.

The intelligent sensor 100 is configured to process a read sensor status command message received from another node requesting the sensor to read the most recent measurements. The message can include requested measurement value types such as: moisture; soil conductivity; soil temperature; and wetted front. The intelligent sensor 100 can generate an ACK message including the requested data to be sent in reply to the read sensor status command message.

The processor 114 of the intelligent sensor 100 can be configured to process and/or generate the above network command messages by executing the unprotected program code 304.

As discussed above, the intelligent sensor 100 can also operate in a bootloader mode for downloading new program code. Exemplary bootloader command messages that can be generated and/or processed when the intelligent sensor 100 operates in the bootloader mode will be discussed.

The intelligent sensor 100 can be configured to process a WRITE_DATA_BLOCK message received from another node specifying a block of data to be wrote to the program memory 300. The intelligent sensor 100 can generate an ACK_WRITE_DATA_BLOCK message confirming that the message data was reprogrammed and read back to/from the program memory. The intelligent sensor 100 can also generate a NACK_WRITE_DATA_BLOCK message indicating that a received WRITE_DATA_BLOCK message was rejected or was valid but the program operation did not complete properly.

The intelligent sensor 100 can be configured to process a READ_DATA_BLOCK message received from another node requesting a block of data to be read from the program memory. The intelligent sensor 100 can generate an ACK_READ_DATA_BLOCK acknowledging the READ_DATA_BLOCK message and returning the requested data. The intelligent sensor 100 can also generate a NACK_READ_DATA_BLOCK message indicating that a received READ_DATA_BLOCK message was rejected.

The intelligent sensor 100 can be configured to process a START_APPLICATION message received from another node requesting the processor 114 to reset from bootloader mode to main application mode. The intelligent sensor 100 can also generate an ACK_START_APPLICATION message for acknowledging reception of the START_APPLICATION message or a NAK_START_APPLICATION message for indicating that the received START_APPLICATION message was rejected.

The intelligent sensor 100 can be configured to process a START_SENSOR_BOOTLOADER message received from another node for requesting the processor 114 to reset from main application mode to bootloader mode. The intelligent sensor 100 can also generate an ACK_START_SENSOR_BOOTLOADER message for acknowledging reception of the START_SENSOR_BOOTLOADER message and to indicate that the bootloader mode is active or a NAK_START_SENSOR_BOOTLOADER message indicating that the received START_SENSOR_BOOTLOADER message was rejected.

The processor 114 of the intelligent sensor 100 can be remotely reprogrammed by another node on the network 200 transmitting the START_SENSOR_BOOTLOADER message to the intelligent sensor 100. The intelligent sensor 100 will transmit the ACK_START_SENSOR_BOOTLOADER message to the node in reply and begin to operate in the bootloader mode. The intelligent sensor 100 will stop operating in the bootloader mode and begin to operate in the main application mode after a predetermined time period if no WRITE_DATA_BLOCK or READ_DATA_BLOCK messages are received.

The WRITE_DATA_BLOCK or READ_DATA_BLOCK messages can include frames of a sensor code update file in ASCII format with no delimiters. Each frame can be preceded by 4 characters indicating the frame length, in bytes. For example, a frame in which the 4 character field is hexadecimal may be: 00127C525F7A0D6C8A0782BDB7289A178D8A6718. The 0012 is the frame length, in hexadecimal, specifying that the next 18 bytes (36 characters) complete the frame.

A node can begin sending the frames, starting from the beginning of the file, within WRITE_DATA_BLOCK messages. The node will wait for an ACK message from the intelligent sensor 100 indicating a successful frame load before sending the next frame. The intelligent sensor 100 can respond with a NAK message to indicate a failed frame load. The node can then retry the operation, or, if it fails again, abort the download and inform the user that the update failed.

After all frames have been sent and acknowledged, the node can send the START_APPLICATION message to the intelligent sensor 100, which can send the ACK message in response to indicate a successful update.

Figure 6A:
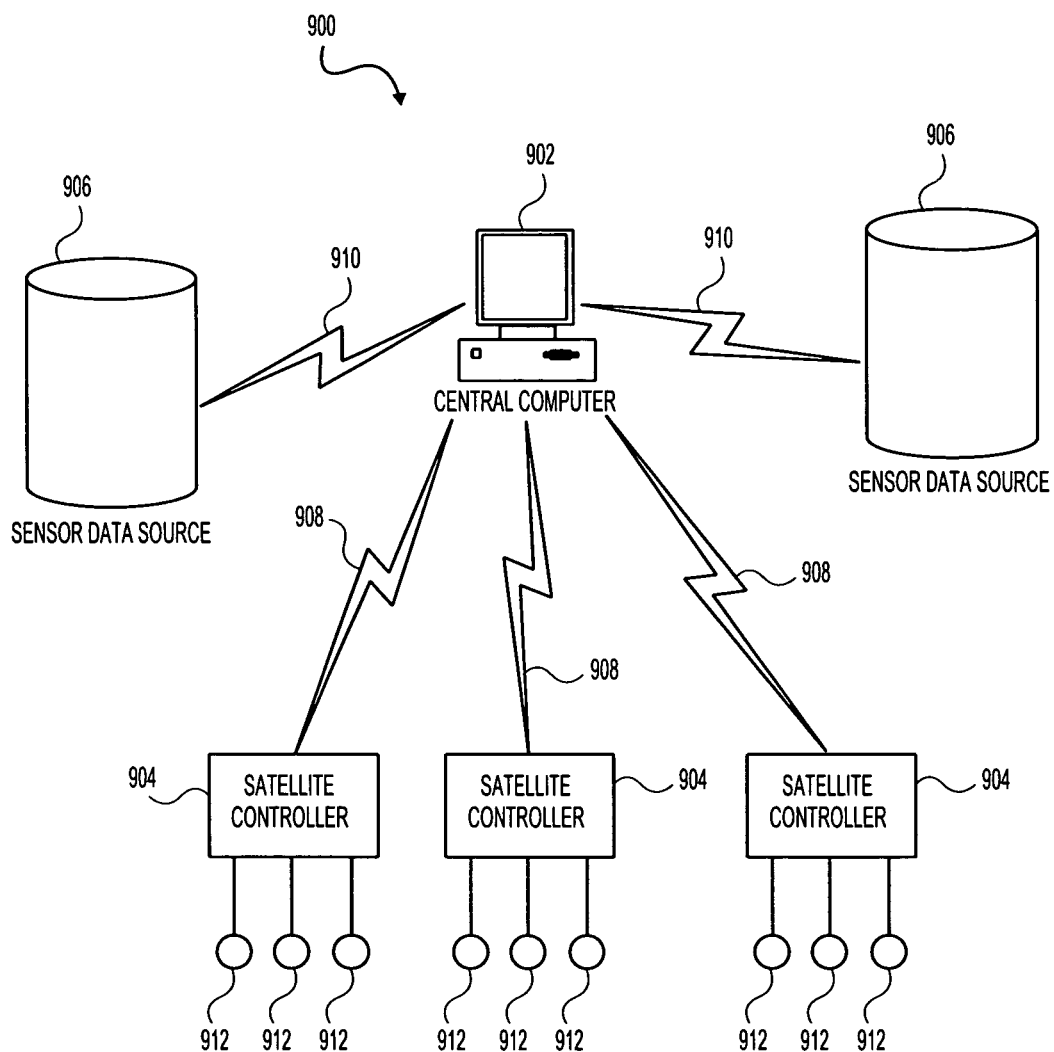
FIGS. 6A-6B are illustrations of conventional irrigation control systems.
Figure 6B:
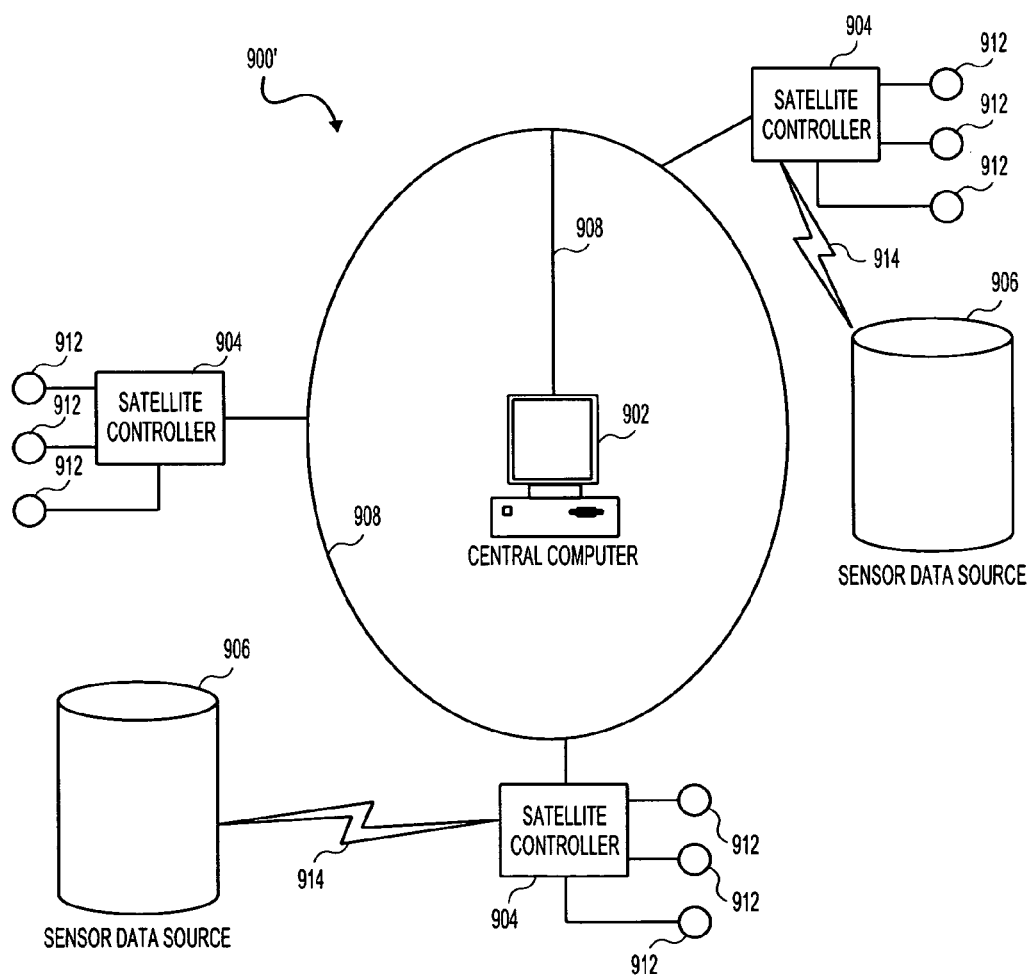

Returning to FIG. 2, the intelligent sensors 100 are preferably operated remotely from another node in the network 200 such as the HH 204, the central computer 206, the satellite controller 202, to obtain sensor data. That is, the intelligent sensors 100 can share sensor data via the connection to the bus 208 of the network 200. A particular intelligent sensor 100 can be queried by other remote devices, or it can broadcast data on the network 200. As a result, only a single communication channel is required between the intelligent sensor 100 and the network 200, thereby reducing system cost in comparison to the systems shown in FIGS. 6A-6B.

Figure 7:
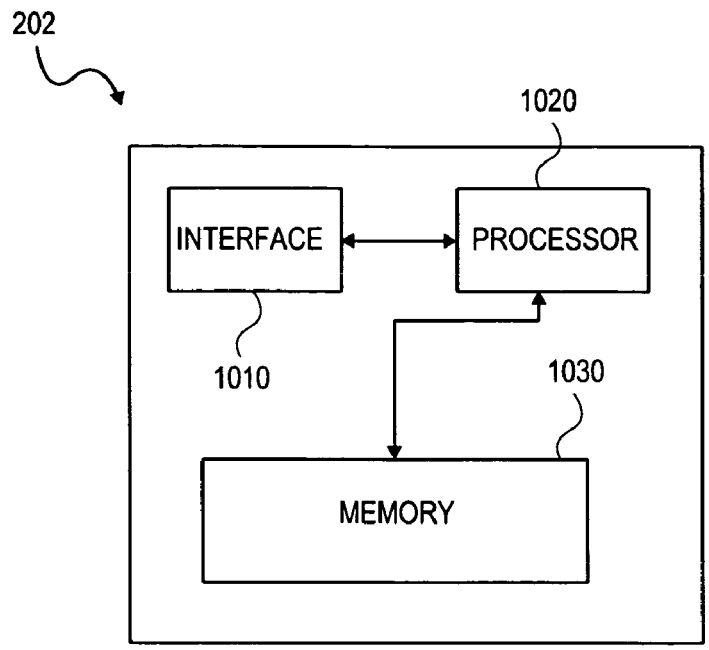
FIG. 7 is a block diagram of an exemplary irrigation satellite field controller.

Referring to FIGS. 2 and 7, the irrigation satellite field controllers 202 can include an interface 1010, a processor 1020 coupled to the interface 1010, and a memory 1030 including instructions for configuring the processor 1020. The interface 1010 couples a satellite controller 202 to valves 210 and to the communication bus 208 of the network 200. The processor 1020 executes the instructions in the memory 1030 to generate a control message requesting soil-related data from one of the intelligent sensors 100 coupled to the peer-to-peer distributed network 200. The interface 1010 transmits the control message to the intelligent sensor 100 and receives a broadcast message including the soil-related data in response to the control message. The processor 1020 can also be configured to operate the valves in accordance with the broadcast message.

Figure 8:
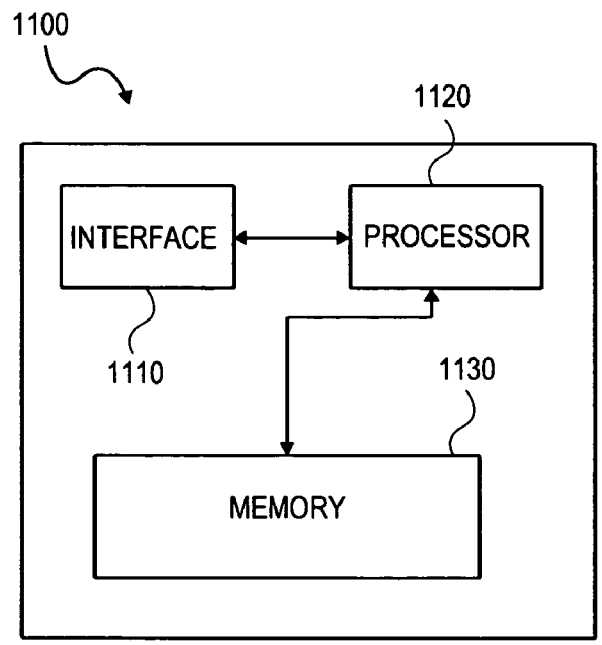
FIG. 8 is a block diagram of an exemplary control device.

Referring to FIGS. 2 and 8, a control device 1100, which can be, for example, the HH 204 or the central computer 206, can include an interface 1110, a processor 1120 coupled to the interface 1110, and a memory 1130 including instructions for configuring the processor 1120. The interface 1110 couples the control device to the communication bus 208 of the peer-to-peer distributed network 200. The processor 1120 is configured to generate a sensor control message to be transmitted by the interface 1110 to an intelligent sensor 100 coupled to the network 200 to request soil-related data. The processor 1120 is also configured to generate an irrigation control message to be transmitted by the interface to an irrigation satellite field controller 210 by the interface.

The control messages generated by the control device 1100 and the irrigation satellite field controllers 202 include the network commands and bootloader commands discussed above.

For example, the control device 1100 or the field controllers 202 can update the main application of a particular intelligent sensor 100 by transmitting the update file to the intelligent sensor within WRITE_DATA_BLOCK messages. The control device 1100 can further generate control messages including an irrigation schedule to be sent to one of the field controllers 202 based upon sensor measurements received in the broadcast messages from the intelligent sensor 100. The control messages can also be configuration messages including a schedule for acquiring the soil related data from the moisture sensor and generating the broadcast message.

The number of intelligent sensors 100 is not limited to a specific field controller 202, the ports of a specific field controller 202 or manageable connections of the central computer 206. Rather, the sensors 100 are global in scope to the network 200 and are only limited by the communication channel (i.e. bandwidth or electrical loading) or the network's addressable range. Additional sensors 100 can be added to the network 200 simply by linking to the existing bus 208. Further, the firmware of the sensors 100 can be can be upgraded through the existing network bus 208 (remotely) as enhancements are available.

Thus, a significant advantage, the ability to share system resources, is realized by utilizing the peer-to-peer architecture. One or more, or all satellite controllers 202 and intelligent sensors 100 can be repeaters, and can maintain links to one or more, or all other satellite controllers 202 and intelligent sensors 100. One or more, or all satellite controllers 202 can obtain data from the intelligent sensors 100 to the bus 208. Further, if one of the intelligent sensors 100 includes a user interface, it can also read data from another intelligent sensor 100 connected to the bus 208.

The term "irrigation related data" can refer to, for example, moisture data, soil conductivity, soil temperature, wetted front data and/or soil salinity and variations and evolutions thereof. The term "irrigation related data sensor" can refer to, for example, a sensor transducer for sensing the irrigation related data which is deployed directly on, in or adjacent to soil and variations and evolutions thereof.

The term "operation parameters" can refer to, for example, a schedule for acquiring the irrigation related data from the irrigation related data sensor and generating the broadcast message, the rate at which it acquires measurement data and variations and evolutions thereof.

The term "destination node" can refer to, for example, a node on the network 200 receiving a message from another node and variations and evolutions thereof. The term "irrigation system" can refer to, for example, an irrigation controller 202 and intelligent sensor 100 connected to the peer-to-peer distributed network and variations and evolutions thereof.

The term "source address" can refer to, for example, identification information for a node on the network originating a message and variations and evolutions thereof. The term "destination address" can refer to, for example, identification information for one or more nodes on the network 200 and variations and evolutions thereof.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. An intelligent sensor device comprising:
an irrigation sensor configured to sense analog irrigation information and generate digital irrigation related data therefrom;
an interface configured to mutually transmit and receive communications directly, without routing through a central computer, to irrigation satellite controllers in a peer-to-peer distributed irrigation satellite controller network over a communication bus of the peer-to-peer distributed irrigation satellite controller network;
an internal inter-integrated-chip (Inter-IC) communication bus entirely internal to the intelligent sensor device and coupled to the irrigation sensor to receive digital irrigation related data therefrom;
a processor coupled to the interface, the processor is coupled to the irrigation sensor by the internal Inter-IC communication bus and obtains the digital irrigation related data from the irrigation sensor over the Inter-IC communication bus; and
a memory coupled to the processor, the memory including instructions for configuring the processor to transmit a message including the irrigation related data over the interface via the communication bus of the peer-to-peer distributed irrigation satellite controller network to a destination node coupled to the peer-to-peer distributed irrigation satellite controller network.

2. The intelligent sensor of claim 1, wherein the message includes a source address of the intelligent sensor and a destination address indicative of the destination node.

3. The intelligent sensor of claim 1, wherein the interface is further for receiving a configuration message including operation parameters, and the processor is configured to generate the message in accordance with the operation parameters, wherein the operation parameters include a schedule for acquiring the irrigation related data from the irrigation sensor and generating the message.

4. The intelligent sensor of claim 1, wherein the irrigation related data includes data representative of one of soil moisture, soil conductivity, soil temperature, wetted front data and soil salinity.

5. The intelligent sensor of claim 1, wherein the processor is further configured to store a historical log of the soil related data from the irrigation sensor in the memory.

6. The intelligent sensor of claim 1, wherein:
the interface is further for receiving a data write message from another destination node specifying data to be written into the memory via the communication bus, wherein the processor is further configured to write the data specified in the data write message in the memory; and
the interface is further for receiving a data read message from the another destination node specifying data to be read from the memory via the communication bus, wherein the processor is further configured to read the data specified in the data read message from the memory.

7. The intelligent sensor of claim 6, wherein the processor is further configured to generate an acknowledgement message including the data specified in the data read message, wherein the interface transmits the acknowledgement message to the another destination node via the communication bus.

8. The intelligent sensor of claim 1,
wherein the processor is configured to operate in a main mode for generating the message including the soil related data and a bootloader mode for uploading or downloading an application,
wherein the interface is further for receiving a bootloader mode message from another destination node via the communication bus and the processor is configured to operate in the bootloader mode in response to the bootloader mode message,
wherein the interface is further for receiving an update file including the application from the another destination node, and the processor is configured to store the application in the memory.

9. The intelligent sensor of claim 1, wherein:
the interface receives a control message from a control device or an irrigation satellite field controller coupled to the peer-to-peer distributed irrigation satellite network via the communication bus, the control message including operation parameters, and the processor is configured to generate the message in accordance with the operation parameters, wherein the operation parameters include a schedule for acquiring the irrigation related data from the irrigation sensor and generating the message; and
the destination node is the control device or the irrigation satellite field controller.

10. An irrigation satellite field controller configured to be operatively coupled to one or more valves of an irrigation system, comprising:
a first interface configured to mutually transmit and receive communications directly, without routing through a central computer, to irrigation satellite controllers in a peer-to-peer distributed irrigation satellite controller network over a communication bus of the peer-to-peer distributed irrigation satellite network;
a first processor coupled to the first interface; and
a memory coupled to the first processor, the memory including instructions for configuring the first processor to generate a control message requesting irrigation related data uniquely addressed to an intelligent sensor coupled to the peer-to-peer distributed irrigation satellite network,
wherein the first interface transmits the control message to the intelligent sensor, and receives a broadcast message including a source address of the intelligent sensor and the irrigation related data in response to the control message via the communication bus,
wherein the intelligent sensor device includes at least:
an internal inter-integrated-chip (Inter-IC) communication bus entirely internal to the intelligent sensor device and coupled to an irrigation sensor to receive digital irrigation related data therefrom; and
a second processor coupled to a second interface, the second processor is coupled to the irrigation sensor by the internal Inter-IC communication bus and obtains the digital irrigation related data from the irrigation sensor over the Inter-IC communication bus.

11. The irrigation satellite field controller of claim 10, wherein the first processor is further configured to operate the one or more valves in accordance with the broadcast message.

12. The irrigation satellite field controller of claim 10, wherein the first processor is further configured to generate a sensor control message specifying a schedule for acquiring irrigation related data and generating a broadcast message including the irrigation related data, and the first interface transmits the sensor control message to the intelligent sensor.

13. The irrigation satellite field controller of claim 10, wherein the first interface receives an irrigation control message from a control device coupled to the communication bus of a peer-to-peer distributed irrigation satellite network, wherein the first processor is further configured to operate the one or more valves in accordance with the irrigation control message, wherein the irrigation control message specifies an irrigation schedule.

14. A control device for an irrigation management system comprising:
a first interface operable to transmit and receive communications directly, without routing through a central computer, to irrigation satellite controllers in a peer-to-peer distributed irrigation satellite controller network over a communication bus of the peer-to-peer distributed irrigation satellite network;
a first processor coupled to the first interface; and
a memory coupled to the first processor, the memory including instructions for configuring the first processor to generate a sensor control message requesting irrigation related data uniquely addressed to an intelligent sensor coupled to the peer-to-peer distributed irrigation satellite network; and
wherein the first interface transmits the sensor control message to the intelligent sensor via the communication bus of the peer-to-peer distributed irrigation satellite network,
wherein the intelligent sensor device includes at least:
an internal inter-integrated-chip (Inter-IC) communication bus entirely internal to the intelligent sensor device and coupled to an irrigation sensor to receive digital irrigation related data therefrom; and
a second processor coupled to a second interface, the second processor is coupled to the irrigation sensor by the internal Inter-IC communication bus and obtains the digital irrigation related data from the irrigation sensor over the Inter-IC communication bus.

15. The control device of claim 14, wherein the first processor is further configured to generate an irrigation control message specifying an irrigation schedule for an irrigation controller coupled to the peer-to-peer distributed irrigation satellite network, wherein the first interface transmits the irrigation control message to the irrigation controller via the communication bus of the peer-to-peer distributed irrigation satellite network.

16. The control device of claim 15, wherein the first interface receives a broadcast message from the intelligent sensor including irrigation related data, wherein the first processor is further configured to generate the irrigation control message in accordance with the irrigation related data, wherein the sensor control message further specifies a schedule for acquiring the irrigation related data and generating a broadcast message including the irrigation related data.

17. The control device of claim 14, wherein the first processor is further configured to generate a data read message specifying data to be read from a memory of the intelligent sensor.

18. The control device of claim 14, wherein the first processor is further configured to generate a bootloader mode message for configuring the intelligent sensor to operate in a bootloader mode.

19. The control device of claim 14, wherein the first processor is further configured to generate a data write message specifying data to be written into a memory of the intelligent sensor.

20. The control device of claim 19, wherein the data of the data write message includes an update file including an application, and the first interface transmits the data write message to the intelligent sensor.

* * * * *